Nov. 13, 1945.  H. H. MERRIMAN  2,388,862
CABLE SPLICING CLAMP
Filed March 16, 1942  2 Sheets-Sheet 1
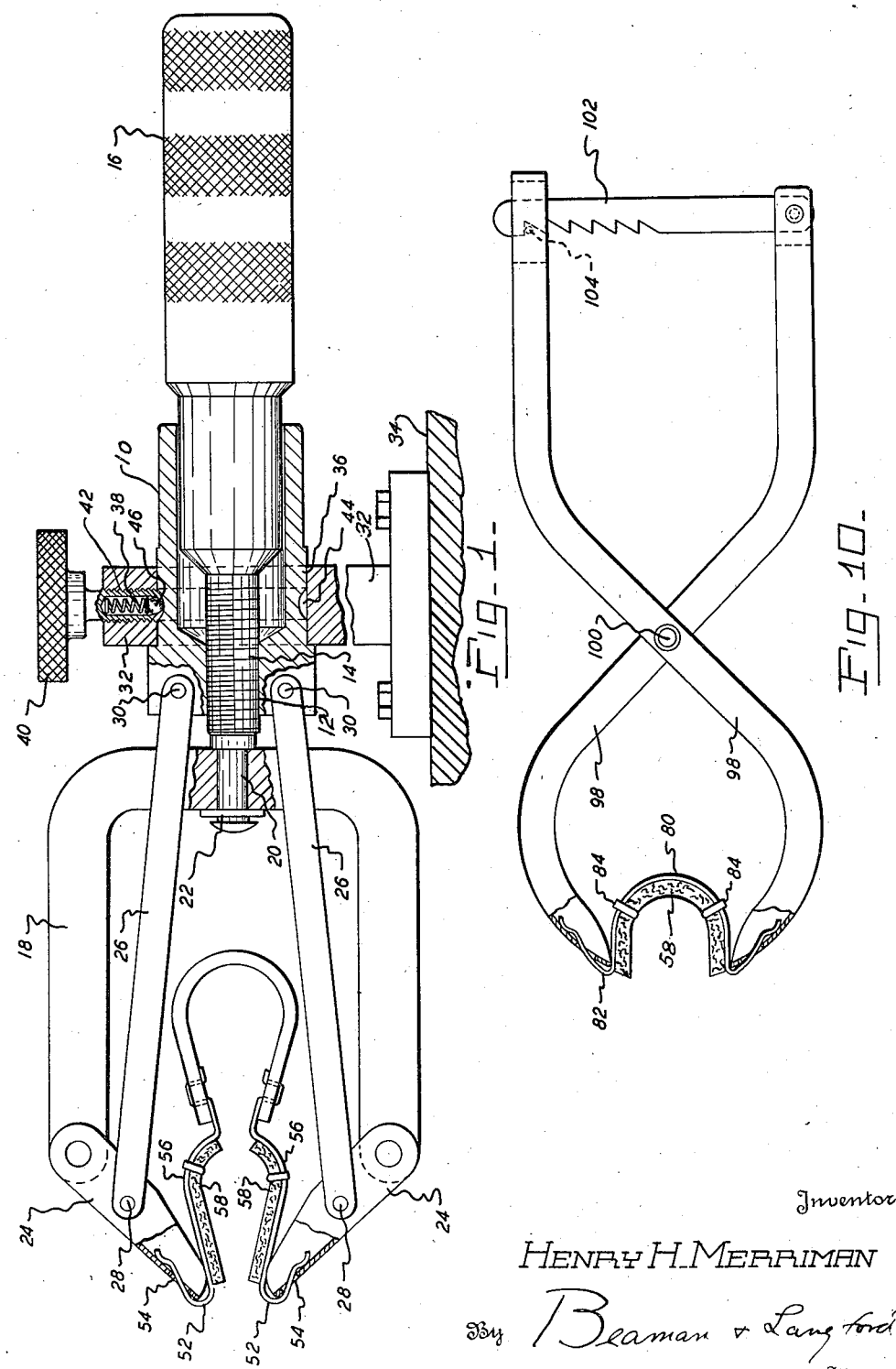
Inventor
HENRY H. MERRIMAN
By Beaman & Langford
Attorneys Nov. 13, 1945. H. H. MERRIMAN 2,388,862
CABLE SPLICING CLAMP
Filed March 16, 1942 2 Sheets-Sheet 2
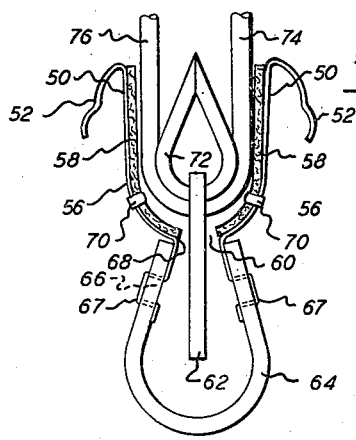
Fig. 4.
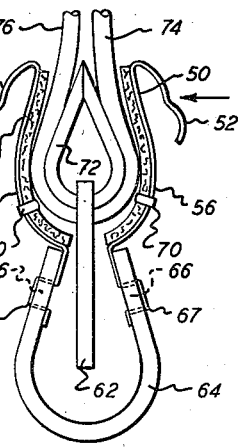
Fig. 5.
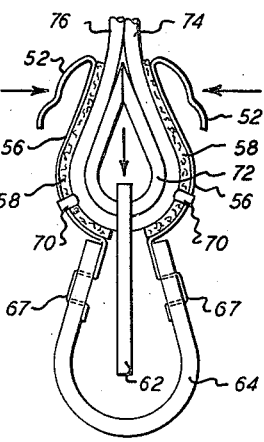
Fig. 6.
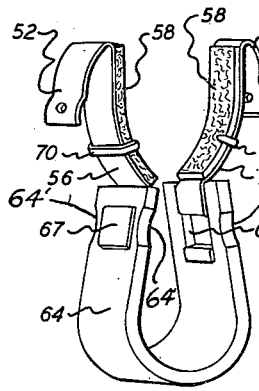
Fig. 3.
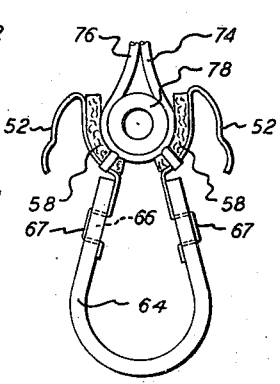
Fig. 7.
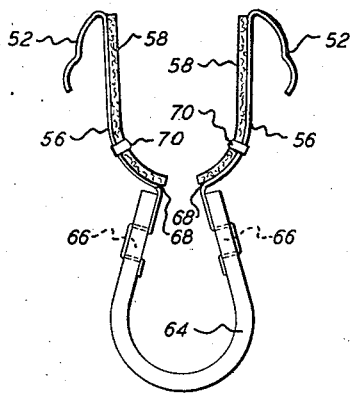
Fig. 2.
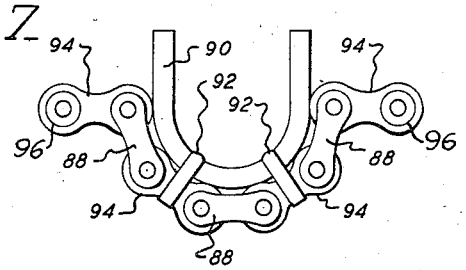
Fig. 8.
Fig. 9.
Inventor
HENRY H. MERRIMAN
By Beaman & Langford
Attorneys Patented Nov. 13, 1945

2,388,862

UNITED STATES PATENT OFFICE 2,388,862

CABLE SPLICING CLAMP

Henry H. Merriman, Jackson, Mich., assignor to Harry D. Boardman, Jackson, Mich., as trustee Application March 16, 1942, Serial No. 434,835

2 Claims. (Cl. 140—121)

The present invention relates to clamping devices, being particularly concerned with devices used to facilitate the assembly of cables and similar elements upon thimbles, bushings and the like.

In practice the principles of the present invention have proven to be particularly well adapted to the splicing of wire cable upon thimbles and bushings. In this connection it has been the practice heretofore to loop the cable around the thimble or bushing, splicing the free end of the cable into the body of the cable directly adjacent the thimble or bushing. For holding the thimble or bushing in the cable loop, a groove is usually provided. The inability to sufficiently tighten the loop of the cable into the groove to prevent displacement of the thimble or bushing from the cable loop has resulted in numerous cable failures in the past. This has been particularly true in the aircraft industry, where large numbers of control cables are employed which in use are subjected to excessive vibration.

According to the present disclosure, the means for tightening the cable loop into the groove of the thimble or bushing is in the form of a band clamp capable of substantially conforming to a major portion of the cable loop with the cable firmly positioned in the groove of the thimble or bushing; the band clamp having a contractable throat portion for forcing the thimble or bushing into the cable loop and holding the same in this position while the free end of the cable is being spliced or otherwise secured to the body of the cable.

Also herein disclosed and made a part of the present invention is an improved holder and actuator for the aforesaid clamp, which is especially well adapted for splicing cable. Preferably the clamp is so designed as to permit different sizes to be selectively used with the same holder and actuator.

The manner in which the cable is brought into and held in intimate contact with the reinforcing member of the cable loop is considered to involve a new method of wrapping a flexible element upon a relatively rigid element.

Thus one of the objects of the present invention is to provide an improved clamp for holding a looped element in firm surface contact with an element embraced by the loop.

Another object is to provide an improved method of bringing a cable loop into intimate contact with a reinforcing element for the loop.

Another object is to provide an improved device for facilitating the splicing of the looped end of the cable upon an internal reinforcement for the loop.

A further object is to provide an improved distortable clamp or jaw for wrapping and clamping a distortable element, as for example a wire cable, about a relatively rigid element, as for example, a reinforcing thimble or bushing, while the distortable element is being secured in position, as for example, by splicing.

A still further object is to provide an improved splicing tool for cables for wrapping the cable loop upon a reinforcing element for the loop, wherein the loop carries an anchorage part.

A still further object is to provide an improved splicing tool.

A still further object is to provide an improved splicing tool having interchangeable adaptor clamps or jaws of different sizes.

A still further object is to provide a resilient band type of clamp for assembling a cable loop upon a reinforcing element.

These and other objects and advantages residing in the combination, construction and arrangement of the parts will more fully appear from the following specification and claims:

In the drawings:

Fig. 1 is a side elevational view of my improved splicing tool shown supported in a standard, with portions of the standard broken away and shown in vertical cross section, Fig. 2 is a side elevational view of one form of my improved clamp or jaw, Fig. 3 is a perspective view of the clamp shown in Fig. 2, Figs. 4, 5 and 6 illustrate the manner in which the clamp functions to wrap the cable around the thimble, the pressure means for actuating the clamp being omitted, Fig. 7 is a view similar to Fig. 6 showing the cable wrapped around a bushing, Fig. 8 is a view similar to Fig. 2 of a different form of clamp, Fig. 9 is a side elevational view of a further modified form of clamp, and Fig. 10 is a side elevational view of a modified form of splicing tool for applying the operating pressure to a clamp embodying the present invention.

While the pressure applying means for the operation of my improved clamp may take numerous forms, in Fig. 1 is disclosed one commercial form of tool, which is particularly well adapted to the splicing of cables. As shown in Fig. 1, the tool comprises a body portion 10, having a threaded bore 12 to receive the threaded shaft 14, carried by the rotatable handle 16. A yoke 18 is provided with a bore 20 to receive for relative rotation the unthreaded end 22 of the shaft 14. Pivoted at the outer ends of the yoke 18 are pressure arms 24. Members 26 pivoted at 28 to the arms 24 and at 30 to the body 10 control the inward and outward movement of the pressure arms 24 upon manipulation of the shaft 14 and the yoke 18 carried thereby.

A standard 32 shown bolted to the surface 34 has a bearing 36 in which the body 10 is supported for rotation. The body 10 and associated structure is held in desired positions of adjustment in the standard 32 through a screw clamp 38 manipulated through a knurled knob 40 and operating into a threaded bore 42 at the upper end of the standard 32. As shown the body 10 is provided with a groove 44 into which a spring stress friction detent 46 is projected through manipulation of the screw clamp 38. With this arrangement, depending how tightly pressure is applied to the knob 40, either snug drag is placed upon the body 10 permitting it to be rotated against slight resistance, or the body 10 is virtually clamped in a fixed position in the standard 32.

The form of the clamp shown as supported by the pressure members 24 comprises a spring steel band 50 so shaped at its upper ends 52 as to be snapped into slots 54 and removably held in position with spring tension. Complementary portions 56 of the band 50 define a generally U-shaped clamp or jaw. Preferably these portions carry liners 58 of nonmetallic material, of firm yet yieldable character, as for example leather.

To provide a gap at 60 to give clearance to suitable cable anchorage structure 62, a rigid yoke member 64 is provided having slots 66 into which U-shaped portions 67 of the band 50 are inserted and held against withdrawal by deflecting inwardly the sides 64' as shown in Fig. 3. It will be noted that the band 50 is bent around the upper ends of the yoke 64 at 68 to rigidly position what may be considered the central portion of the U-shaped resilient clamp. Thus support of the central portion of the U-shaped clamp is provided at opposite sides of the gap at 60 without affecting the resiliency and distortability of the portions 56. Clips 70 firmly secure the liner members 58 to the portions 56.

In Figs. 4, 5 and 6 an attempt has been made to illustrate the manner in which my improved clamp or jaw wraps a flexible wire cable into intimate contact with a reinforcing thimble to form an end loop in the cable preparatory to splicing. In Fig. 4 the clamp is shown in its unstressed or open position with a reinforcing thimble 72 of conventional channel design, and a flexible wire cable 74 shown threaded through an eye of the loop anchor 62. Upon the application of force in the direction of the arrows shown in Fig. 5, the clamp is caused to contract upon the cable 74 urging the same into the channel of the thimble 72. In Fig. 6 the clamp is shown fully contracted upon the cable and thimble with the continued inward movement of the upper ends of the clamp causing the thimble to be forced downwardly in the direction of the vertical arrow shown and any slack in the cable to move upwardly with the result that with the clamp contracted as shown in Fig. 6 the cable 74 is in intimate contact with the bottom of the channel of the thimble 72 throughout its entire extent. With the cable and thimble so assembled, the free end 76 of the cable can then be spliced into the body of the cable in the usual manner with the assurance that the cable loop is rigidly embracing the reinforcing thimble. The flexibility of the spring steel band 50 and the limited yieldability of the liners 58 compensate for all small variations in the cable and thimble construction, and at the same time prevents any injury to these parts during the clamping and splicing operation. It will be noted that the dimension of the portions 56 is such that they are capable of being wrapped around the major portion of the cable loop with the throat or part of greatest contraction being located to one side of the major diameter of the cable loop which results in the thimble being forced downwardly into the outer end of the loop of the cable as indicated in Fig. 6.

The cable 74 is shown wrapped around a grooved bushing 78 in lieu of the more irregular shaped thimble 72. The wrapping and clamping action shown in Fig. 7 corresponds exactly to that disclosed in Fig. 6.

Referring to Fig. 8, a modified form of the invention is shown in which no provision is made for accommodating a cable anchor embracing the loop and thimble. As shown the clamp comprises a spring steel band 80 shaped as indicated, having snap in portions 82 for supporting the clamp in the slots 54 of the pressure arms 24 of the tool shown in Fig. 1. Clips 84 secure the yieldable liner 58 of leather or other suitable material to the band 80. The clamp disclosed in Fig. 8 functions in the same manner as the clamp illustrated in Figs. 4, 5 and 6.

In Fig. 9, in lieu of using a spring steel band for forming the distortable clamp, the clamp is fabricated from a link of roller chain 88 of conventional construction, having the yieldable liner 90 secured thereto by clips 92. Suitable pressure arms 94 are connected at 96 in the ends of the chain 88. Movement of the arms 94 in the direction indicated by the arrows will result in the cable and thimble being intimately assembled in the manner indicated in Figs. 4, 5 and 6.

Innumerable devices will suggest themselves for applying the necessary pressure to the upper end of the clamp so as to assemble the cable and thimble in the manner indicated in Figs. 4, 5 and 6. The tool shown in Fig. 1 is the present preferred commercial form. In Fig. 10 is illustrated a simplified tool capable of being used in connection with any one of the clamps shown in Figs. 2 to 9 inclusive. As shown, the tool in Fig. 10 comprises a pair of arms 98, with ends carrying, by way of example only, the adaptor clamp shown in Fig. 8. A pivoted notched bar 102 on the opposite end of one of the arms 98 coacts with a latch 104 in a well-known manner to hold the tool in different positions of clamping adjustment.

It will be understood that with different sizes of thimbles, bushings and cables, different size adaptor clamps will be used. In practice, the splicing tool of Fig. 1 will include a set of different size adaptor clamps or jaws which may be quickly interchanged. Where it is not convenient to perform the splicing operation upon a bench, the tool of Fig. 1 may be removed from the standard 32 and manually supported or used in any other necessary manner.

While it is preferred to form the clamp from spring metal having a facing of yieldable material, the yieldable liner may be omitted. Moreover, the clamp may be formed entirely of leather, heavy woven material or other yieldable and distortable material having limited stretch or reinforced to prevent other than limited stretch.

Having thus described my invention, what I desire to secure by Letters Patent and claim is:

1. A splicing tool comprising a body portion having a threaded bore, a rotatable handle having a threaded shaft extending through said body and operating in said threaded bore, a yoke carried upon one end of said shaft with respect to which the shaft is relatively rotatable, pressure members pivoted upon said yoke, members extending between said pressure members and said body to control the pivotal movement of said pressure members upon rotation of said shaft through said handle, a distortable clamp supported between said pressure members for wrapping a cable loop upon a reinforcing element, a standard having a bearing portion in which said body portion is rotatably supported, and clamping means in said standard for holding said body in various positions of adjustment.

2. A tool for intimately positioning an end loop of a flexible cable upon a relatively rigid internal loop reinforcing element comprising pressure means, a distortable band clamp having a contractable open throat portion, an operative connection between said means and opposite sides of said throat portion, said band clamp upon contraction of said throat being shaped to urge the cable toward the reinforcing element throughout substantially the entire loop of the cable, and rigid means spacing portions of said band clamp to provide a gap to receive cable anchor means interlocked with said loop and reinforcing element.

HENRY H. MERRIMAN.